Jan. 27, 1953     A. E. BISHOP     2,626,706
PROCESS FOR THE EXTRACTION OF
PECTIN FROM SUGAR BEET PULP
Filed July 14, 1949
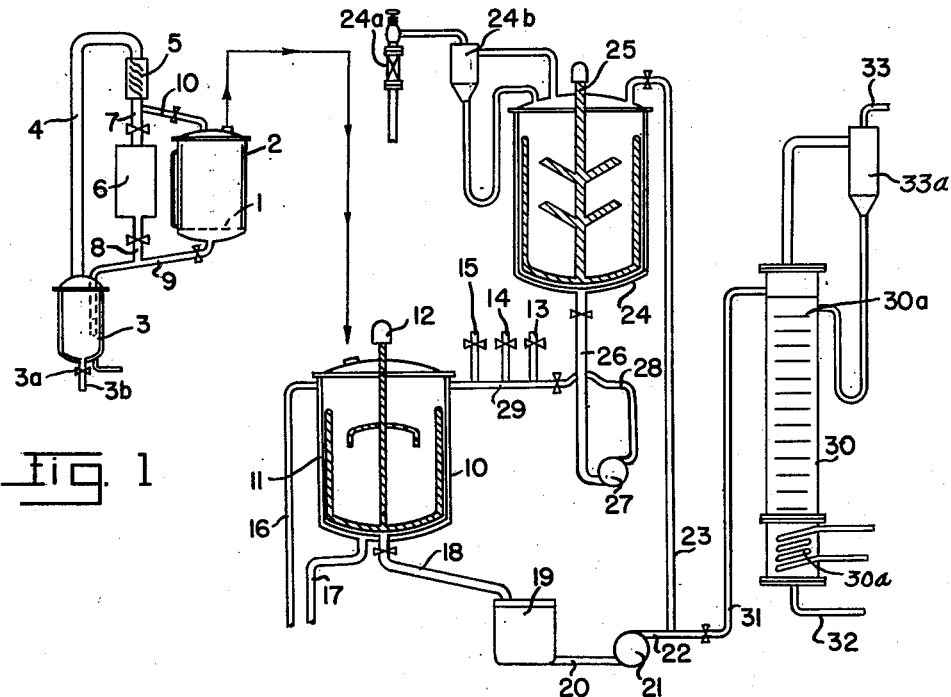
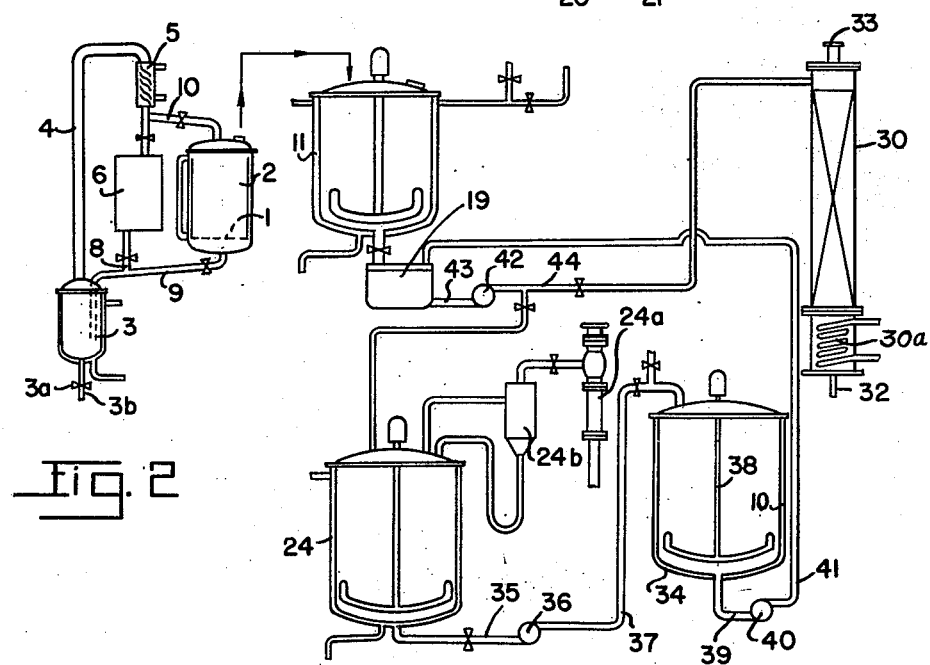
INVENTOR
ALFRED E. BISHOP
BY
Toulmin & Toulmin
ATTORNEYS Patented Jan. 27, 1953

2,626,706

UNITED STATES PATENT OFFICE 2,626,706

PROCESS FOR THE EXTRACTION OF PECTIN FROM SUGAR BEET PULP

Alfred E. Bishop, Dayton, Ohio, assignor to Superior Sugar Refining Company, Menominee, Mich., a corporation of Michigan Application July 14, 1949, Serial No. 104,695

4 Claims. (Cl. 260—209.5)

My invention relates to a process of extracting pectin from sugar beets and particularly from beet pulp.

It is the object of my invention to provide a continuous process that will permit continuous production of pectin from the beet pulp and to produce it in large and economical quantities completely free from any contamination, free from waxes and other substances that would depreciate its value.

It is the object of my invention to provide a succession of steps by which the beet pulp is dewaxed, the pulp is digested and the pectin separated, the volume of liquid contained in the pectin is reduced, the pectin is precipitated and finally removed by centrifuging or a similar step and thereafter drying and grinding to provide a pectin powder that is stable to moisture, absorption and fermentation.

It is a particular object of this invention to provide a pectin product from beet pulp that is free from impurities that heretofore made beet pectin not as desirable as fruit pectin.

Referring to the drawings,

Figure 1 is a diagrammatic drawing illustrating the typical equipment necessary for the practice of this process.

Figure 2 is a similar view showing a modified form of the apparatus.

PROCESS FOR EXTRACTING PECTIN FROM SUGAR BEET WASTE MATERIALS

This invention relates to a process for extracting pectin from sugar-beet waste materials, more particularly from sugar-beet pulp. It will increase the by-product value of the beet pulp and will provide a new source of material from which pectin can be prepared.

It has been found that pectin can be efficiently removed from sugar-beet waste materials, such as sugar-beet pulp by employing the following procedures:

The sugar-beet pulp is initially treated with a solvent mixture, consisting of 33% alcohol and 67% benzene by volume, for the purpose of removing natural gum and wax substances from the plant tissues.

The removal of these gum and wax substances permits a better wetting and solvent action in the subsequent aqueous extraction of pectin from the cell tissues of the plant material.

By laboratory tests it was found that by the use of 1¾ pounds of this solvent mixture, one pound of dry beet pulp can be efficiently extracted in a reflux type extractor and the gum and wax substances removed in a period of four hours. Other methods of extraction can be employed, but less solvent is required and the efficiency of extraction is better when the reflux method is employed.

Other materials such as acetone, methylethyl ketone, methyl alcohol, propyl alcohol, toluene, carbon tetrachloride, etc. which are recognized as solvents for gums and waxes may be employed in place of ethyl alcohol and benzene. However, by the use of this mixture, a two component solvent having a constant boiling point can be employed in one operation.

After completion of the solvent extraction the pulp residue, free of gum and wax substances, is digested in eighteen pounds of water. To hasten the solvency of the pectin materials which by nature, are produced and stored in various forms in the plant tissue, the following procedure is employed.

The aqueous pulp slurry is made alkaline to a pH value of 8.0 to 8.5 by adding a ten percent (10%) solution of sodium hydroxide (NaOH). For this a very small amount of the alkali is required. The mixture is then agitated for one (1) hour at room temperature, approximately 75° F. This causes a swelling action of the cellular structure of the pulp and permits greater solvent action of the water solution.

The aqueous mixture is then acidified to a pH value of 3.5 to 4.0 using hydrochloric acid. Other acids such as a sulphuric or phosphoric may be used. If concentrated pectin solution is to be prepared in place of pectin powder organic acids such as acetic, lactic, tartauc or citric acids should be employed, because in the latter case the acid constituents will be retained in the final pectin product and are accepted in food materials.

The acidified pulp mixture is then digested by heating for a period of one or two hours at 180° to 190° F. under atmospheric pressure and with agitation. Under these conditions all of the pectin materials are hydrolized and made soluble to the water solution. The digestion may be conducted under pressure of ten to fifteen (10 to 15) pounds per square inch in a closed tank within a period of fifteen to thirty (15 to 30) minutes; however, under these conditions some of the pectins may be decomposed through excessive hydrolysis and slightly lower yields obtained as the result. The pressure treatment offers a shorter processing period in exchange for maximum yield.

The pulp residue is then separated from this mixture by means of a centrifuge and is retained for further by-product treatment. The filtrate obtained by this separation contains the pectin in solution.

The acidity of the filtrate is determined at this time and if necessary more acid is added to adjust the pH value within the range of 3.5 to 4.0. The solution is then concentrated under controlled evaporation. This can be done under heat and vacuum in which, the temperature is not allowed to exceed 190° F. and the degree of vacuum is gradually increased during the evaporation. By adding 0.25 of an ounce of a wetting agent, such as octyl alcohol, ethylene glycol monophenyl ether or diethyl-tridecanol sulfate, to the aqueous filtrate prior to evaporation the tendency of foaming during concentration is reduced. Concentration is carried on until the volume has been reduced to approximately twenty-five (25) percent.

The concentrate is again adjusted to a pH value of 3.5 to 4.0 by use of a small amount of acid. This usually requires between 0.25 and 0.50 ounce of 12% hydrochloric acid. This concentrate, while at a temperature of 140° to 150° F., is diluted by adding to it one and a half to two (1.5 to 2.0) volumes of alcohol. The alcohol causes the pectin to separate from the aqueous solution as a flocculant, white precipitate which settles rapidly.

After standing for a period of one (1) hour to permit complete precipitation, the pectin is removed by filtration. This may be done in various conventional methods; however, the use of the centrifuge is preferred for efficiency and ease of washing the pectin residue. The washing is done with fresh solvent that has been slightly acidified. This washing removes entrained impurities and assists in removing residual water.

Materials other than ethyl alcohol, such as methyl alcohol, propyl alcohol, acetone or methyl-ethyl ketone may be used for precipitating pectin from the aqueous concentrate.

After filtration and washing, the pectin residue is dried at a temperature of 140° to 150° F. either under vacuum or with a current of air passing over it. The dry residue is then ground to a powder, screened to size and packaged. The powder may vary from a pale brown to a white color depending upon the care taken during the processing. The average yield obtained is three and one-quarter (3.25) ounces of pectin powder per pound of dry sugar beet pulp.

WAX REMOVAL

Referring to the drawings in detail, the beet pulp is first delivered to the extractor basket 1 in the drum 2 where it is treated with a mixed solvent of alcohol-benzene. The extractor is the reflux type. It is provided with a solvent still 3, steam jacketed, connected by the pipe 4 (carry the solvent vapors) to the condenser 5 (to deliver liquid solvent to the extractor) and a storage drum 6 connected to the condenser by the pipe 7. On the other end of the storage drum the pipe 8 is connected into the pipe 9 that leads from the bottom of the extractor to the top of the solvent still. A line is connected into the top of the extractor from the line 7 as at 10.

In operation the gum and wax are removed by use of the mixed solvent alcohol-benzene as set forth in greater detail later in this patent application. The gum and wax collect in the bottom of 3 and are drawn off through valve 3a and pipe 3b.

DIGESTOR

The pulp, now free of gum and waxes, is removed from the extractor and placed in a larger size container for digestion with water designated as the digestor 11. This digestor is provided with a motor driven stirrer 12. The tank 11 provides space for the swelling action that takes place in the beet pulp during this treatment. The pulp is covered with water and mixed with water by mechanical agitation of stirrer 12. The line 13 designates a water feed line, the line 14 is a chemical feed line and the line 15 is an alcohol feed line. The lines 16 and 17 are supply and drain lines as heretofore described. The bottom of the tank is connected by drain pipe 18 to a centrifuge 19 which in turn is connected with the line 20 to the pump 21 which is charged to the line 22.

EVAPORATION

One branch of the line 22 as at 23 leads to the top of the evaporator 24 in which is mounted a motor driven stirrer 25. A vacuum is induced by the injector 24a. The trap 24b collects free solvent. The bottom of the tank 24 is connected with a line 26 to the pump 27 which is in turn connected by the pipe 28 to the line 29 to which are connected the supply lines 13, 14 and 15. The pulp is transferred from the digester and is filtered, by means of a centrifuge, while hot. This removes the pulp from the water which contains the pectin. While in the separator the residue is washed with fresh hot water. The spun-dry pulp is removed and retained for further by-product use.

The filtrate remaining is transferred to the evaporator 24 which is a vacuum type of evaporator where the water can be removed. This is accomplished by the usual means of producing a vacuum through the injector 24a. This still injector creates the vacuum so that the water can be removed at temperatures not to exceed 190° F. Upon appropriate reduction of volume, the evaporator is stopped and the concentrate is transferred to the precipitating tank.

PRECIPITATION

Alcohol is added to cause the pectin to separate from its aqueous solution in the form of a white flocculant precipitate which settles fairly rapidly. Upon the addition of alcohol the mixture is thoroughly agitated and then allowed to stand to permit complete precipitation.

The water and alcohol are separated in the solvent still and column 30 which is fed by the incoming line 31. The waste passes out of the pipe 32. The line 33 is connected to a vacuum to assist in the separation of the water and alcohol.

Referring to Figure 2, the dewaxing apparatus is the same as in Figure 1. The digestor 11 is the same as in Figure 1.

In this arrangement the evaporator 24 is separated from the precipitator 34 to which it is connected by the bottom pipe 35 and pump 36 and line 37. The motor driven stirrer 38 operates within the precipitator 10 in the usual manner. The resultant product is transferred by the pipe 39, pump 40, pipe line 41 to the centrifuge 19 whence the liquid consisting of water and alcohol is delivered by the pump 42 from the pipe 43 to pipe 44 and thence to the top of the solvent still and column 30. The column 30 has separator plates 30a over which the alcohol and water flow until reaching the heated area adjacent coils 30d whence the alcohol vapors rise and pass out 33. 33a constitutes a trap for returning liquid condensate to its still.

SEPARATION

It will be observed that the final separation is by use of the centrifuge 19. In this centrifuge the residue is washed with fresh alcohol that has been slightly acidified.

DRYING AND GRADING

Upon completion of the foregoing steps the pectin residue is dried by heating it 140° to 150° F., ground and screened to size and then packaged. The pectin powder thus prepared is stable to moisture, absorption and fermentation.

Example I

The following is an example of a detailed proceduce of pectin separation:

A. *Gum and Wax Removal.*—One pound of the stem dried beet pulp is placed in a reflux type extractor and extracted with one quart of mixed solvents for the removal of these substances. The solvent mixture contains 33% by volume of denatured ethyl alcohol and 67% by volume of benzene. This extraction requires a period of from two and a half to four hours depending upon the rate of solvent cycling. The pulp, now free of gum and waxes, is removed from the extractor and placed in a larger sized container for digestion with water.

B. *Digestion.*—This, the second step in the processing, requires a larger sized tank to provide space for the swelling action that takes effect in the beet pulp during this treatment. When transferred to this tank the pulp is covered with 2 gallons of water and mixed by mechanical agitation. The mixture is made alkaline to a pH value of 8.0 to 8.5 by adding an alkali. This requires between 1¼ to 1¾ ounces of a 10% sodium hydroxide solution. The pulp is agitated in this solution for a period of ¾ of an hour at a temperature of 65° to 80° F. This treatment dissolves some of the pectin materials and also opens the cell structure by the swelling action produced. The mixture is then made acid to a pH value of 3.5 to 4.0 by adding sulphuric acid. This normally requires between 1½ to 1¾ ounces of a solution of one to one part by volume by sulphuric acid and water. This acid mixture is agitated and heated at a temperature of 180° to 190° F. for 1½ hours. This treatment hydrolyzes and dissolves those pectin materials not previously removed from the cell fibres.

C. *Filtration.*—The third step is to separate the pulp from the water. To do this the mixture is transferred from the digestor to the separator and filtered while hot, preferably by means of a centrifuge, to remove the pulp from the water which contains the pectin. While in the separator the residue is washed with ⅛ to ¼ gallon of fresh, hot water. This wash water is collected with the original filtrate. The spun dry pulp is then removed and retained for further by-product use. The acidity of the filtrate is tested and if necessary adjusted to a pH range of 3.5 to 4.0 at this point. This usually requires from ⅛ to ¼ ounce more weak acid. ¼ ounce of a wetting agent, such as octyl alcohol is also added to reduce the foaming action during the next operation.

D. *Evaporation.*—The filtrate is next transferred to an evaporator where the volume is reduced by removing 75 to 80% of the water. This is best done in a vacuum type evaporator where the water can be removed at temperatures not exceeding 190° F. To prevent foaming it is necessary to slowly increase the degree of vacuum during this operation. When the volume has been reduced to approximately ¾ of a gallon, the evaporation is stopped and the concentrate is transferred to the precipitating tank.

E. *Precipitation.*—The concentrate, while at a temperature of 140° to 150° F. is diluted by adding to it 1¼ to 1½ gallons of alcohol. The alcohol causes the pectin to separate from its aqueous solution in the form of a flocculant white precipitate, which settles fairly rapid. Upon addition of the alcohol the mixture is thoroughly agitated and then allowed to stand for a period of an hour to permit complete precipitation.

F. *Filtration.*—The pectin precipitate is now ready to be separated by filtration. This can be done on the centrifuge previously used for removal of the pulp material. A fine cloth filter media is better for this work than a screen. When separated from the water-alcohol solution, the pectin residue is washed with approximately ⅛ gallon of fresh alcohol that has been slightly acidified with dilute sulphuric acid. The alcohol-water filtrate is transferred to the fractionating still.

The pectin is also removed from the centrifuge and dried at 140° to 145° F., either under vacuum or with a slight current of air passing over it. The dry residue is then ground to a powder, screened to size and packaged. Pectin in this form is quite stable with respect to moisture absorption and fermentation.

The following is a summary of the steps that are taken in this process which result in this new pectin product which is practically devoid of acetyl groups. The resulting product therefore has all of the desirable characteristics of fruit pectin. The steps are in summary:

A. Gum and wax removal by use of a mixed solvent of alcohol-benzene in a reflux type of exractor.

B. Digestion of pulp in water, using first a mild alkaline solution at a temperature of 65° to 80° F. and then a weak acid solution heated at 180° to 190° F. for 1½ hours to dissolve pectin from beet fibers.

C. Filtration by use of the centrifuge is most efficient. This permits separation of the mixture while hot and permits washing of the residue with hot water.

D. Evaporation of the weak aqueous solution of pectin is best accomplished in a vacuum type evaporator. By this water can be removed at a temperature not exceeding 190° F. thus avoiding decomposition of free pectin.

E. Precipitation of pectin is accomplished by transferring the aqueous concentrate to a large tank and while at a temperature of 140° to 150° F., diluting with approximately two volumes of alcohol. This causes the pectin to separate as a white flocculant precipitate.

F—*Separation.*—After the pectin has been precipitated, it is separated from the water-alcohol solution by means of a centrifuge. This residue is then washed in the centrifuge with fresh alcohol that has been slightly acidified.

G—*Drying and grinding.*—The pectin residue is then removed from the separator, dried by heating at 140° to 150° F., ground and screened to size and then packaged. The pectin powder thus prepared is quite stable to moisture, absorption and fermentation.

It will be understood that the following claims comprehend within their terms such modifications and changes as may occur to one skilled in the art and are necessary to adapt this invention to varying conditions of use.

I claim:

1. In a method of recovering pectin from sugar beet pulp the steps of removing wax and gum by use of a mixed solvent of alcohol-benzene in a reflux type of extractor; digesting the pulp in water by first using a mild alkaline solution at a temperature of 65° to 80° F. and then using a weak acid solution heated to 180° to 190° for approximately one and one half hours to dissolve pectin from the sugar beet fibers; filtering the resultant mass with a centrifuge and separating the mixture while hot and washing the residue with hot water; evaporating the weak aqueous solution of pectin in a vacuum type of evaporator and removing water at a temperature not exceeding 190° F.; precipitating pectin by transferring aqueous concentrate to a tank while it is at a temperature between 140° and 150° F. and diluting it with approximately two volumes of alcohol to precipitate the pectin as a white flocculant precipitate; and separating by centrifuge the water and alcohol from the pectin and washing the pectin; and drying and grinding the pectin by first heating from 140° to 150° F., grading it and screening to size to produce a stable product unaffected by moisture absorption or fermentation.

2. A process of separating pectin from sugar beet pulp which comprises the steps of (a) washing the pulp with a solvent mixture comprising benzene and alcohol to remove gum and wax impurities, (b) digesting the resultant pulp residue which is substantially free of gum and wax in an aqueous alkaline solution containing enough alkali to establish a pH value of about 8.0 to 8.5, (c) acidifying the aqueous alkaline pulp mixture to a pH of about 3.5 to 4.0 by the addition of acid and digesting the resultant acidified mixture at a temperature of about 180 to 190° F., to hydrolyze and solubilize the pectin constituent of the beet pulp, (d) separating the solid pulp residue from the aqueous filtrate to recover a filtrate which contains the pectin in solution, (e) concentrating the resultant pectin containing filtrate solution by evaporation of solvent while maintaining the temperature of the solution below about 190° F. until the volume of the filtrate has been substantially reduced, (f) adjusting the concentrated filtrate to a pH of about 3.5 to 4.0, and (g) precipitating the pectin as a flocculent white precipitate by the addition of alcohol and separating the pectin thus precipitated from the alcohol.

3. A process of separating pectin from sugar beet pulp which comprises the steps of (a) refluxing the pulp with a solvent for the natural gum and wax impurities present in the pulp, (b) digesting the resultant pulp residue which is substantially free of gum and wax in an aqueous alkaline solution having a pH value of about 8.0 to 8.5 and a temperature of between about 65° to 80° F., (c) acidifying the digested aqueous pulp mixture to a pH of about 3.5 to 4.0 and digesting the resultant acidified mixture at a temperature of about 180 to 190° F., (d) separating the solid pulp residue from the aqueous filtrate and washing the residue with water, (e) concentrating the resultant filtrate solution by evaporation of solvent while maintaining the temperature below about 190° F. until the volume of the filtrate has been reduced to approximately one-half its original volume, (f) adjusting the thus concentrated filtrate to a pH of about 3.5 to 4.0 and thereafter precipitating the pectin as a flocculent white precipitate by the addition of alcohol and separating the pectin thus precipitated from the alcohol by filtration.

4. In the method of extracting pectin from sugar beet pulp, the improvement steps which include digesting the pulp in an aqueous alkaline solution containing enough alkali to establish a pH value between about 8.0 to 8.5 and while maintained between a temperature range of about 65 to 80° F., acidifying the resultant aqueous alkaline mixture to a pH of about 3.5 to 4.0 by the addition of acid and digesting the resultant acidified mixture at a temperature of between about 180 to 190° F. to hydrolyze and dissolve pectin from the sugar beet fibers, separating the solid pulp residue from the aqueous filtrate to recover a filtrate containing the pectin in solution, concentrating the filtrate by evaporation of the solvent under vacuum conditions and while maintaining the solution at a temperature not exceeding about 190° F., and precipitating the pectin from the concentrated filtrate as a flocculent precipitate by the addition of alcohol, separating the water and alcohol from the precipitated pectin and drying and grinding the pectin to produce a non-fibrous stable pectin product.

ALFRED E. BISHOP.

REFERENCES CITED

The following references are of record in the file of this patent:

UNITED STATES PATENTS

| Number | Name | Date |
|---|---|---|
| 1,393,660 | Beylik | Oct. 11, 1921 |
| 1,976,741 | Mithoff | Oct. 16, 1934 |
| 2,233,574 | Baker et al. | Mar. 4, 1941 |
| 2,444,266 | Owens et al. | June 29, 1948 |
| 2,502,477 | Owens | Apr. 4, 1950 |

OTHER REFERENCES

Myers et al.: "Fruit Jellies," Univ. of Del. Agri. Exper. Sta., Bull. No. 160, Tech No. 10, June 1929, pp. 4, 6, 7.

Elwell: "Pectin," Published by Washington Sec. of State Jan. 1939, pp. 9, 11, 12.